(12) United States Patent
Taylor

(10) Patent No.: US 10,810,335 B2
(45) Date of Patent: Oct. 20, 2020

(54) METHOD AND APPARATUS FOR EXPLICIT SIMULATION

(71) Applicant: Autodesk, Inc., San Rafael, CA (US)

(72) Inventor: Lee M. Taylor, Cedar Crest, NM (US)

(73) Assignee: AUTODESK, INC., San Rafael, CA (US)

(*) Notice: Subject to any disclaimer, the term of this patent is extended or adjusted under 35 U.S.C. 154(b) by 349 days.

(21) Appl. No.: 15/875,874

(22) Filed: Jan. 19, 2018

(65) Prior Publication Data

US 2019/0228123 A1 Jul. 25, 2019

(51) Int. Cl.
| | |
|---|---|
| *G06F 30/23* | (2020.01) |
| *G06T 17/20* | (2006.01) |
| *G06F 30/17* | (2020.01) |
| *G06F 119/18* | (2020.01) |

(52) U.S. Cl.
CPC .............. *G06F 30/23* (2020.01); *G06F 30/17* (2020.01); *G06T 17/20* (2013.01); *G06F 2119/18* (2020.01)

(58) Field of Classification Search
CPC ....... G06F 30/23; G06F 2119/18; G06T 17/20
USPC .............................................. 703/7
See application file for complete search history.

(56) References Cited

U.S. PATENT DOCUMENTS 2,348,253 A * 5/1944 Griswold .............. B64C 21/025
244/211

\* cited by examiner

*Primary Examiner* — Brian S Cook
(74) *Attorney, Agent, or Firm* — Gates & Cooper LLP

(57) ABSTRACT

A method, apparatus, and system provide the ability to simulate dynamic motion for a computerized model (of finite mesh elements). An element diagonal lumped mass matrix of the mesh, an estimate of a highest element eigenvector and eigenvalue of the mesh, and a kinematic state of the model are computed. Processing iterates until exceeding a time duration. Incremental strain and stress tensors, and hypo-elastic material constants are computed. Within the time duration iteration, eigenvalues are converged, a power-sweep stress field is computed from the strain field using the material constants; divergence of the power-sweep stress field is computed using the current gradient operator; and a power-sweep estimate is computed. Upon convergence, the stability limit is determined and utilized as a time interval for simulating the dynamic motion.

14 Claims, 3 Drawing Sheets

METHOD AND APPARATUS FOR EXPLICIT SIMULATION

BACKGROUND OF THE INVENTION

1. Field of the Invention

The present invention relates generally to dynamic motion simulations, and in particular, to a method, system, apparatus, and article of manufacture for performing finite element numerical simulation of dynamic motion for every element in a mesh in every time step/increment of a simulation.

2. Description of the Related Art

Finite element analysis (FEA) is a computerized method for predicting how a product reacts to real-world forces, vibration, heat, fluid flow, and other physical affects. Finite element analysis shows whether a product will break, wear out, or work the way it was designed. During the product development process, FEA is used to predict what is going to happen when the product is used. FEA works by breaking down a real object into a mesh—a large number (thousands to hundreds of thousands) of finite elements, such as little cubes. The behavior of each element over time is predicted. All of the individual behaviors are added up to predict the behavior of the actual object. FEA helps predict the behavior of products affected by many physical affects including mechanical stress, mechanical vibration, fatigue, motion, heat transfer, fluid flow, electrostatics, and plastic injection molding. Prior art FEA is an extremely computational expensive operation requiring evaluation of force, materials, geometry and how they all interact in a time based simulation. There's a need to improve the performance in a FEA, specifically, in the way that the simulations are evaluated and the time intervals required for that simulation.

Explicit dynamics is a mathematical technique for integrating the equations of motion of the FEA model through time. Finite element numerical simulations of dynamic motion that utilize an explicit dynamics integration rule are required to use a time step that does not exceed the Courant Stability Limit for the mesh. The Courant Stability Limit (also referred to as the Courant-Friedrichs-Lewy condition) is a necessary limit/condition for convergence while solving certain partial differential equations numerically. More specifically, the Courant Stability Limit arises in the numerical analysis of explicit time integration schemes, and provides that each time step must be less than a certain time in many time-marching computer simulations, otherwise, the simulation produces incorrect results.

The Courant Stability Limit of the mesh is inversely proportional to the highest natural frequency in the finite element numerical model. Hence, all explicit dynamics finite element applications must determine a conservative estimate for the highest natural frequency of the mesh in order to determine the Courant Stability Limit and ensure that the Courant Stability Limit is not exceeded during the entire duration of the numerical simulation.

The highest natural frequency of a finite element mesh is a function of the geometry of the individual finite elements that comprise the mesh and the material stiffness of each of the individual finite elements of the mesh. For nonlinear problems where the geometry of the elements may be changing due to large deformations and/or the material stiffness may be changing due to nonlinear material response, the highest natural frequency must be continually determined as the numerical model is integrated through time by the explicit time integration rule (a method that calculates the state of a system at a later time from the state of the system at the current time).

The prior art approach to determining the highest element natural frequency in explicit dynamic finite element applications is to perform an element-by-element calculation where the natural frequency for each finite element is estimated using conservative least upper bounds formulas found in the scientific literature. These formulas are applied every time step of the numerical integration to each and every element in the mesh to pick the maximum estimated conservative value over all the mesh. For each new finite element type introduced into the application's element library, appropriate least upper bound estimate formulas must be developed and implemented (e.g., in the software).

The least upper bounds formulas applied to estimate natural frequencies can be particularly problematic for poorly shaped finite elements (e.g. highly skewed tetrahedral elements) and for quadratic elements that exhibit unique higher order modes. Accordingly, what is needed is an efficient and computationally affordable numerical method that accurately computes the highest natural frequency of every element of the mesh (regardless of the shape of the element) in every time step of the simulation.

SUMMARY OF THE INVENTION

Each piece of a finite element analysis (FEA) is evaluated over time according to a particular time interval. Determining these time intervals is critical. If the intervals are too large, the simulation will crash, if too small, they take excessive time. The optimal time for the time interval is referred to as the stability limit for the simulation. This stability limit is the minimum value determined by analyzing every finite element in the model; a value that is a very complex function of the shape, number of nodes, and the material properties of the each element. Embodiments of the invention calculate a precise value for this time interval in a manner that is not computationally expensive; dramatically improving the time to solve. Embodiments of the invention operate in a generic manner that allows different finite element types to be analyzed using a mechanism and method that does not require the finite element application developer to derive new stability limit equations for new element and material types.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
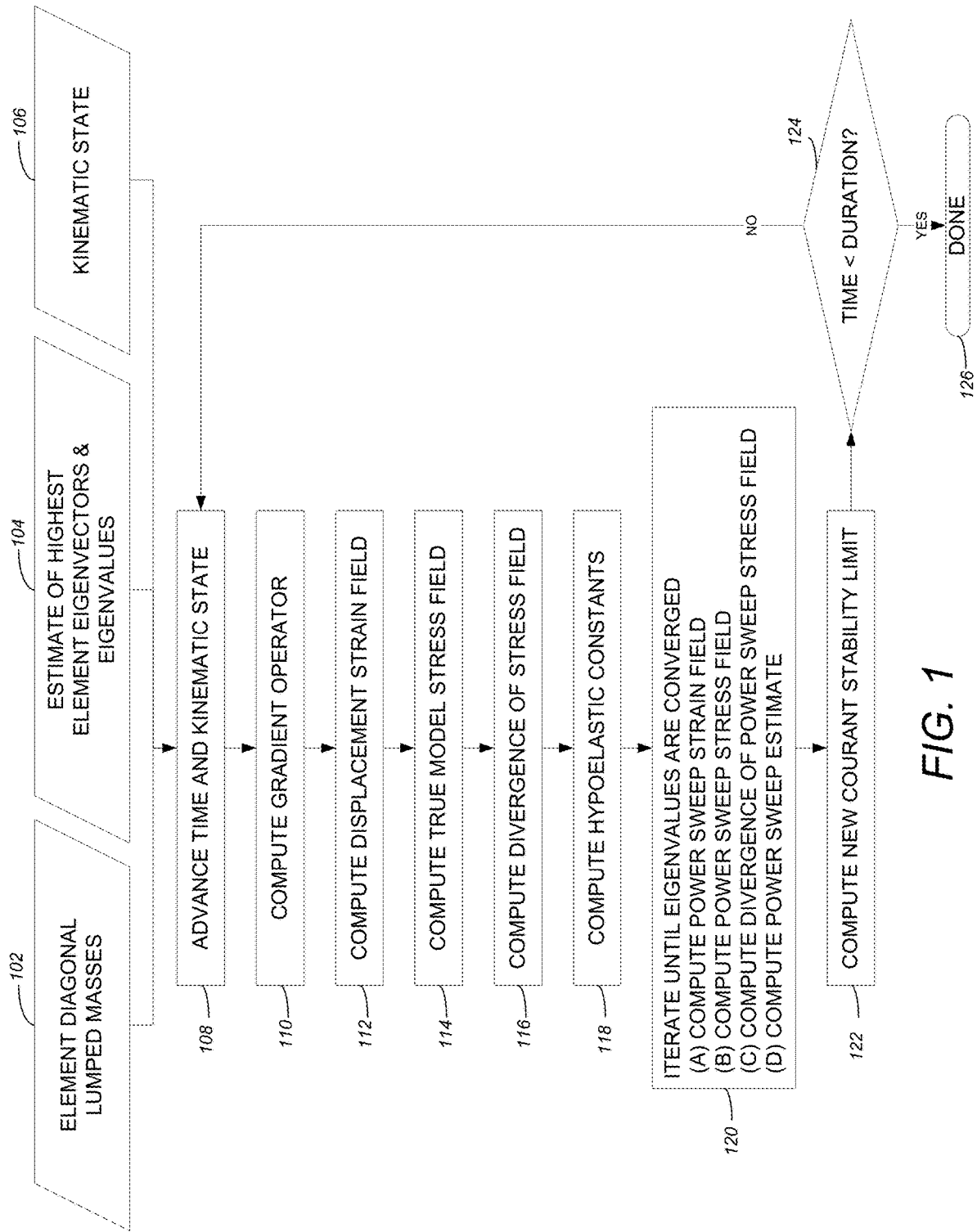
FIG. 1 illustrates the logical flow for performing an explicit simulation of dynamic motion for a computerized model (consisting of finite elements in a mesh) in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention overcome the problems of the prior art by providing an efficient and computationally affordable method to accurately compute and utilize the highest natural frequency of every element of the mesh in every time step/increment of a simulation. Embodiments of the invention utilize the highest natural frequency to determine the Courant Stability Limit of a mesh representative of a model followed by a simulation of dynamic motion for that model. In addition, embodiments of the invention provide a method that re-uses computationally intensive components that are required in each time increment along with the hypoelastic material moduli described below in a stiffness-matrix-free power-sweep method to compute an accurate value for each and every element in the mesh in a generic manner irrespective of the element type.

The Eigenvalue Problem

As described above, the material stiffness of a mesh element impacts the highest natural frequency of a mesh. An analysis of eigenvalues may be utilized to evaluate such a stiffness.

Embodiments of the invention seek to find the highest eigenvalue for the general eigenvalue problem defined as:

$$(K-\lambda M)\cdot v=0 \qquad (1)$$

where K is the symmetric finite element stiffness matrix, M is the diagonal finite element mass matrix, $\lambda$ is the highest eigenvalue or natural frequency of the system, and v is the eigenvector or mode shape associated with the highest eigenvalue. In general, there are n solutions to Equation (1) where n is the rank of the system (i.e. number of equations) but embodiments of the invention are only interested in the highest natural frequency. Accordingly, embodiments of the invention may provide an iterative power sweep method. The iterative power sweep method that is used to solve the highest natural frequency and its associated eigenvector is guaranteed to converge within machine precision in no more iterations that the number of degrees of freedom in the element. In practice, the iterative power sweep method typically converges to a useful result in far less iterations, especially if a good initial guess is utilized (e.g., as the initial input).

Finite Element Stiffness Matrix

The finite element method contains a set of shape functions that are used to define fields across an individual finite element. Each different finite element type defines its own shape functions according to how many nodes make up the element and the dimensionally of the element. The gradients of these shape functions are used to compute a gradient operator matrix (commonly denoted in the finite element literature as $\beta$ and referred to as the "beta-matrix"). In order to compute the precise value for the highest natural frequency of the element, the symmetric finite element stiffness matrix, K, of the eigenvalue problem defined in equation (1) is required. In the finite element formulation this results from the matrix triple product $$K=\beta^T D\beta \qquad (2)$$

where D is the tangent material stiffness of the material points in the finite element volume. The tangent material stiffness matrix in three dimensions is a symmetric 6×6 matrix.

In the finite element method, the internal nodal forces acting on the element are determined by multiplying the nodal displacement field, u, times the element stiffness matrix defined in equation (2). That is $$f=Ku \qquad (3)$$

Hypo-Elastic Material Effective Moduli

In every time step/increment of an explicit dynamics simulation, the finite element method computes the strain increment tensor at a point, $\Delta\varepsilon$. Depending upon the type of material model defined, a constitutive model computes the incremental stress tensor, $\Delta\sigma$, from the incremental strain tensor ($\Delta\varepsilon$). If one poses the constitutive model as a simple "black-box" function, $\Delta\sigma=f(\Delta\varepsilon)$, then through some relatively simple tensor manipulations, one can determine a set of hypo-elastic material constants represented by Lame constants $\hat{\lambda}$ and $\hat{\mu}$. Using indicial notation with the usual convention that repeated indices indicate summation, one can write the equations governing a hypoelastic material as $$\Delta\sigma_{ij}=\hat{\lambda}\Delta\varepsilon_{kk}\delta_{ij}+2\hat{\mu}\Delta\varepsilon_{ij} \qquad (4)$$

Where $\Delta\sigma_{ij}$ is the incremental stress tensor, $\Delta\varepsilon_{ij}$ is the incremental strain tensor, and $\delta_{ij}$ is the standard Kroneker delta tensor used in indicial notation. Equation (4) can be written in terms of volumetric and deviatoric parts as $$\Delta\sigma_{kk}=(\hat{\lambda}+2\hat{\mu})\Delta\varepsilon_{kk} \qquad (5)$$

and $$\Delta s_{ij}=2\hat{\mu}\Delta e_{ij} \qquad (6)$$

where $$\Delta s_{ij}=\Delta\sigma_{ij}-\tfrac{1}{3}\Delta\sigma_{kk}\delta_{ij} \qquad (7)$$

and $$\Delta e_{ij}=\Delta\varepsilon_{ij}-\tfrac{1}{3}\varepsilon\Delta_{kk}\delta_{ij} \qquad (8)$$

The effective bulk modulus follows directly from equation (5)

$$3\hat{K}=3\hat{\lambda}+2\hat{\mu}=\frac{\Delta\sigma_{kk}}{\Delta\varepsilon_{kk}} \qquad (9)$$

Taking the inner product of Equation 6 with the deviatoric strain and solving for the effective shear modulus gives $$2\hat{\mu}=\frac{\Delta s_{ij}\Delta e_{ij}}{\Delta e_{mn}\Delta e_{mn}} \qquad (10)$$

Using the result of Equation (8) with Equation (9), one can calculate the effective dilatational modulus, $\hat{\lambda}+2\hat{\mu}$:

$$\hat{\lambda}+2\hat{\mu}=\tfrac{1}{3}(3\hat{K}+2\cdot 2\hat{\mu}) \qquad (11)$$

Note that for nonlinear materials which soften or stiffen in their response, these effective moduli will not be constant during the simulation and are computed every time step/increment of the simulation. They provide a mechanism to represent the effect of the tangent material stiffness with only two material constants in the right-to-left sequence method described below.

Stiffness-Matrix Free Power Sweep Method

One of the computational advantages of the stiffness-matrix free power sweep method of embodiments of the invention is that the method never actually computes the element stiffness matrix (D) defined in equation (2) (which is required as part of the finite element method). There are two compelling reasons for why the prior art methods are disadvantageous. First, the matrix-triple product (required as part of the finite element method) is expensive to compute. Second, the prior art explicit dynamics method never computes the true tangent material stiffness matrix for nonlinear materials.

The matrix-free power sweep method of embodiments of the invention determines the precise highest natural frequency of any finite element type (this is not a least-upper-bound estimate). The power sweep method is guaranteed to converge within machine precision in no more iterations that the number of degrees of freedom in the element. In practice it typically converges in far less iterations, especially if a good initial guess is provided to the iterative method.

Traditionally, the natural frequency of a finite element is determined by solving the eigenvalue problem given by equation (1).

Embodiments of the invention (via the stiffness-matrix free power sweep method) uses a power sweep iteration method that never computes the element stiffness matrix (D) defined in equation (2) to solve the eigenvalue problem of equation (1). Instead, the effect each of the matrix-triple-product terms of equation (2) is performed in a right-to-left sequence. If one expands equation (3), in terms of equation (2), the following equation results:

$$f = \beta^T D \beta u \quad (12)$$

One may recognize that the matrix triple product (i.e., $\beta^T D\beta$) times the nodal vector (u) can be processed from left to right using computations that one can naturally perform within the explicit dynamics method. First, one may note that the nodal displacements (u) times the gradient operator ($\beta$) produces the strain tensor ($\varepsilon$), $$\varepsilon = \beta u \quad (13)$$

The material constitutive calculation performed in the explicit method computes stress ($\sigma$) from strain ($\varepsilon$). In the classic finite element formulation, this is represented by a tangent material stiffness matrix (D) times the strain tensor ($\varepsilon$) in the form $\sigma = D \varepsilon$ but in the explicit dynamics formulation (of embodiments of the invention), one never forms a tangent material stiffness (D). Rather, embodiments of the invention simply call a function that directly computes stress from strain, $\sigma = f(\varepsilon)$. In the matrix-free powersweep method of embodiments of the invention, the actual constitutive function is represented as an effective hypoelastic material using the effective properties as determined by equations 9, 10 & 11 above.

Finally, the last term in the matrix triple product computes the nodal forces (F) from the divergence of the stresses ($\sigma$) using the transpose of the gradient operator ($\beta^T$):

$$F = \beta^T \sigma \quad (14)$$

Logical Flow

FIG. 1 illustrates the logical flow for performing an explicit simulation of dynamic motion for a computerized model (consisting of finite elements in a mesh) in accordance with one or more embodiments of the invention. Thus, once a computerized model for which dynamic motion will be simulated is obtained, the process of FIG. 1 begins.

Inputs

There are three inputs 102-106 to a stiffness-matrix free power sweep iteration method.

The first input 102 is the element diagonal lumped mass matrices, M.

The second input is an estimate of the highest element eigenvectors (v) of the mesh and highest eigenvalues of the mesh. Upon the first time step/increment (e.g., upon initializing the method), the estimate for the eigenvectors in 104 is simply seeded with random number values normalized to give a unit L-2 norm for the estimated eigenvectors. For all other time steps/increments (i.e., the subsequent time steps/increments/iterations), the eigenvectors & eigenvalues from the previous time step/increment are used. Because the time increments are generally extremely small, the eigenvectors of the system evolve slowly, and generally only one single iteration of the matrix-free power-sweep method in step 120 is required for convergence each time step/increment.

The third input 106 is the kinematic state of the computerized model which includes the values of the displacement, velocity, and acceleration fields at all the nodes of the mesh.

Iterative Process

Steps 108-124 are iterated until the total time duration of the simulation is exceeded.

At step 108, the explicit integration of the kinematic state is performed to advance the displacements, velocities and accelerations and update the time to represent the time at the end of the increment as performed in the prior art.

Steps 110-116 are performed as in the prior art to advance a stress state of the model.

At step 110, the gradient operator matrix, $\beta$, is computed. Such a computation may be for all of the finite elements at the current time step/increment (or may only be for a subset of such finite elements). The gradient operator is a required component of the prior art and hence its re-use in the matrix-free power sweep method does not require that it be re-computed in the matrix-free power sweep.

At step 112, a displacement strain field is computed for all of the finite elements at the current time increment and using the gradient operator matrix ($\beta$) and the displacements of the element's nodes (u) $\varepsilon = \beta u$ At step 114 a true model stress field for all of the elements ($\sigma$) is computed from the displacement strain field using a material function that describes the strain behavior of the actual material, $\sigma = f(\varepsilon)$.

At step 116, the divergence of all the element stress fields (computed at step 114) is computed using the gradient operator, $F = \beta^T \sigma$ At step 118, the hypo-elastic constants are computed. Such a computation at step 118 may also include the computation of an incremental strain tensor as well as an incremental stress tensor of a current time increment. Thereafter, the hypo-elastic material constants $\hat{\lambda}$ and $\hat{\mu}$ are computed from the incremental strain and the incremental stress tensor.

Step 120 contains the iterative method of embodiments of the invention. Input to step 120 is the gradient operator previously computed in step 110 and the element eigenvectors and eigenvalues from the previous time increment.

In step 120, at (A), a power-sweep strain field ($\varepsilon_{ij}$) is computed from the latest estimate of the highest element eigenvectors ($v_j$) 102 of the last iteration using the current gradient operator ($\beta_{ij}$) (i.e., from the gradient operator matrix ($\beta$) 106):

$$\varepsilon_{ij} = \beta_{ij} v_j.$$

In step 120, at (B), the power-sweep stress field ($\sigma_{ij}$) is computed from the strain field ($\varepsilon E_{ij}$) (computed in (A)) using the effective hypo-elastic moduli/material constants, $\hat{\lambda}$ and $\hat{\mu}$, computed in step 118:

$$\sigma_{ij} = \hat{\lambda} \varepsilon_{kk} \delta_{ij} + 2\hat{\mu} \varepsilon_{ij}.$$

In step 120, at (C), the divergence ($F_i$) of the power-sweep stress field ($\sigma_{ij}$) is computed using the current gradient operator ($\beta_{ik}$):

$$F_i = \beta_{ik}\sigma_{ik}.$$

In step 120, at (D), this iteration's estimate (referred to as a "new estimate" or "power-sweep estimate") of the highest eigenvectors is computed by dividing the computed divergence ($F_i$) by the element's (i.e., the finite element at the current time step) diagonal lumped (finite element) mass matrix, M 102. In this regard, the power-sweep estimate includes an estimate of the new highest eigenvector as well as an estimate of a highest eigenvalue based on the new highest eigenvector.

Steps 120 (A)-(D) are iterated until all the highest element eigenvalues are converged. The first time in step 120 begins with the random number estimates and in general require many iterations. Once converged subsequent time steps generally converge in a single iteration due to the slowly evolving nature of the element eigenvectors and eigenvalues. Such convergence may be reached when the estimate of the highest eigenvalue is within a threshold level of a prior highest eigenvalue from a prior iteration. In this regard, when convergence is not reached, the estimate of the highest eigenvector is used as the estimate of the highest element eigenvector (v) in a next/subsequent iteration.

Step 122 computes the model's new Courant Stability Limit using the largest/highest value of all the element highest eigenvalue estimates computed in step 120.

At step 124, a check for completion of the duration of the time integration is conducted. In this regard, if the duration is complete, the process is complete at step 126. However, if more time integration is required, the process begins again at step 108 utilizing the element eigenvectors and eigenvalues computed at step 120 (i.e., the new estimate of the highest element eigenvectors and eigenvalues) as the input 104.

Once complete at step 126, the new Courant stability limit is used as a time interval for simulating dynamic motion. Further, such a step may also include physically building a physical model (corresponding to the computerized model) based on the simulation.

Improvement Over Prior Art Methods

Embodiments of the invention provide a stiffness-matrix free power sweep method that provides clear improvements over the prior art approaches.

For example, precise values are determined for an element's highest natural frequencies. Such an approach avoids using least upper bound estimates that are conservative estimates, resulting in stability limits that result in Courant Stability limits that are up to 20% smaller than the true value for the model. The computational time/expense for an explicit dynamics simulation is directly proportional to the number of time steps used to integrate the duration of the event. Hence, any conservatism in the estimates increases the cost of the simulation.

Another advantage is that embodiments of the invention can be implemented (e.g., written) as a single method that operates on any finite element type. The inputs are simply the element gradient operator matrix, the hypo-elastic moduli, and the eigenvector estimate. Hence there is no need to derive new estimates for new element types. In particular, embodiments of the invention method work for any order element (e.g. linear or quadratic).

Hardware Embodiments

Figure 2:
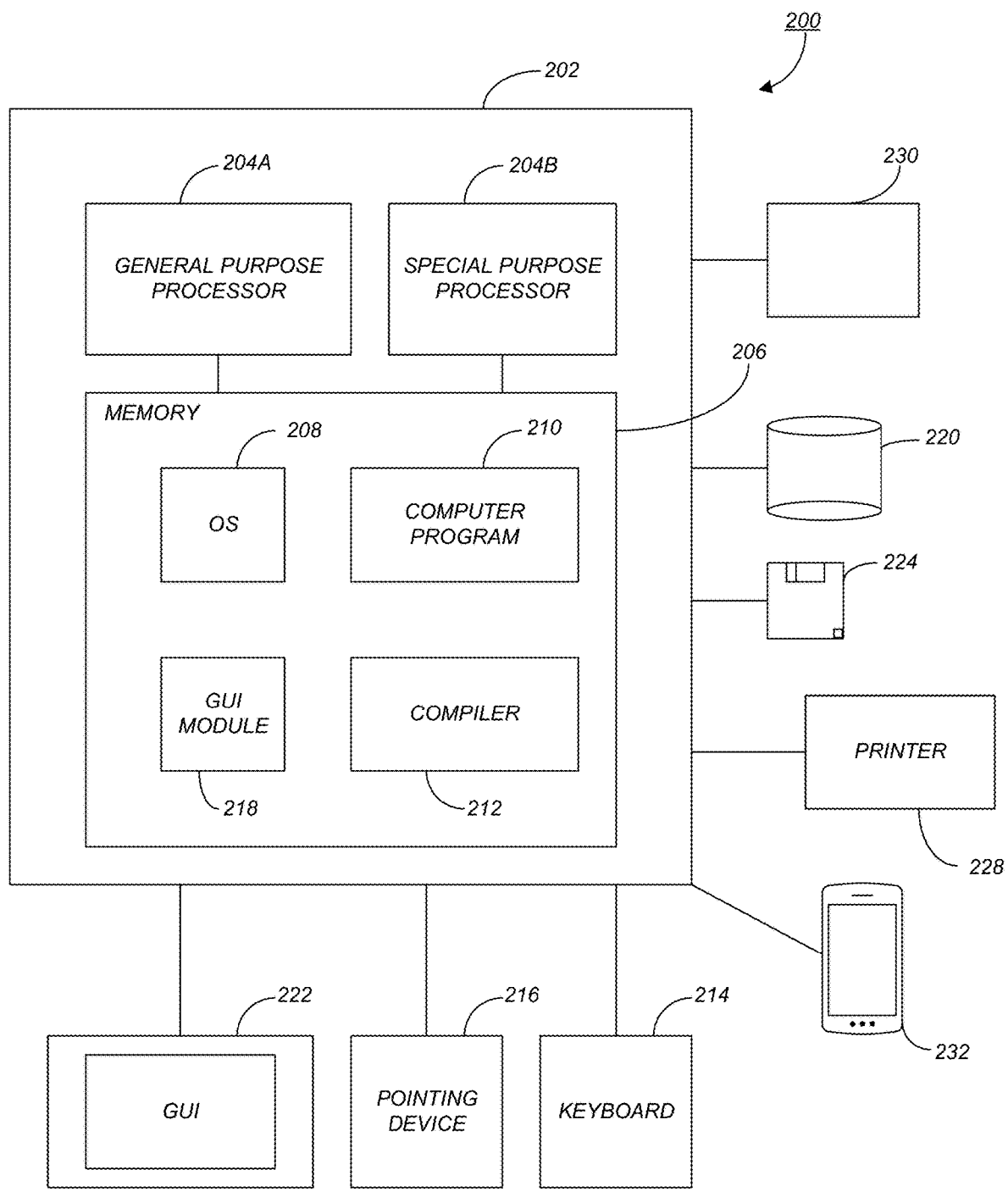
FIG. 2 is an exemplary hardware and software environment used to implement one or more embodiments of the invention.

FIG. 2 is an exemplary hardware and software environment 200 used to implement one or more embodiments of the invention. The hardware and software environment includes a computer 202 and may include peripherals. Computer 202 may be a user/client computer, server computer, or may be a database computer. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to, and/or integrated with, other devices, including input/output (I/O) devices such as a keyboard 214, a cursor control device 216 (e.g., a mouse, a pointing device, pen and tablet, touch screen, multi-touch device, etc.) and a printer 228. In one or more embodiments, computer 202 may be coupled to, or may comprise, a portable or media viewing/listening device 232 (e.g., an MP3 player, IPOD, NOOK, portable digital video player, cellular device, personal digital assistant, etc.). In yet another embodiment, the computer 202 may comprise a multi-touch device, mobile phone, gaming system, internet enabled television, television set top box, or other internet enabled device executing on various platforms and operating systems.

In one embodiment, the computer 202 operates by the general purpose processor 204A performing instructions defined by the computer program 210 (e.g., a dynamic motion simulation application) under control of an operating system 208. The computer program 210 and/or the operating system 208 may be stored in the memory 206 and may interface with the user and/or other devices to accept input and commands and, based on such input and commands and the instructions defined by the computer program 210 and operating system 208, to provide output and results.

Output/results may be presented on the display 222 or provided to another device for presentation or further processing or action. In one embodiment, the display 222 comprises a liquid crystal display (LCD) having a plurality of separately addressable liquid crystals. Alternatively, the display 222 may comprise a light emitting diode (LED) display having clusters of red, green and blue diodes driven together to form full-color pixels. Each liquid crystal or pixel of the display 222 changes to an opaque or translucent state to form a part of the image on the display in response to the data or information generated by the processor 204 from the application of the instructions of the computer program 210 and/or operating system 208 to the input and commands. The image may be provided through a graphical user interface (GUI) module 218. Although the GUI module 218 is depicted as a separate module, the instructions performing the GUI functions can be resident or distributed in the operating system 208, the computer program 210, or implemented with special purpose memory and processors.

In one or more embodiments, the display 222 is integrated with/into the computer 202 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 202 according to the computer program 210 instructions may be implemented in a special purpose processor 204B. In this embodiment, some or all of the computer program 210 instructions may be implemented via firmware instructions stored in a read only memory (ROM), a programmable read only memory (PROM) or flash memory within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program 210 instructions. In one embodiment, the special purpose processor 204B is an application specific integrated circuit (ASIC).

The computer 202 may also implement a compiler 212 that allows an application or computer program 210 written in a programming language such as C, C++, Assembly, SQL, PYTHON, PROLOG, MATLAB, RUBY, RAILS, HASKELL, or other language to be translated into processor 204 readable code. Alternatively, the compiler 212 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 210 accesses and manipulates data accepted from I/O devices and stored in the memory 206 of the computer 202 using the relationships and logic that were generated using the compiler 212.

The computer 202 also optionally comprises an external communication device such as a modem, satellite link, Ethernet card, or other device for accepting input from, and providing output to, other computers 202.

In one embodiment, instructions implementing the operating system 208, the computer program 210, and the compiler 212 are tangibly embodied in a non-transitory computer-readable medium, e.g., data storage device 220, which could include one or more fixed or removable data storage devices, such as a zip drive, floppy disc drive 224, hard drive, CD-ROM drive, tape drive, etc. Further, the operating system 208 and the computer program 210 are comprised of computer program 210 instructions which, when accessed, read and executed by the computer 202, cause the computer 202 to perform the steps necessary to implement and/or use the present invention or to load the program of instructions into a memory 206, thus creating a special purpose data structure causing the computer 202 to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 202.

Figure 3:
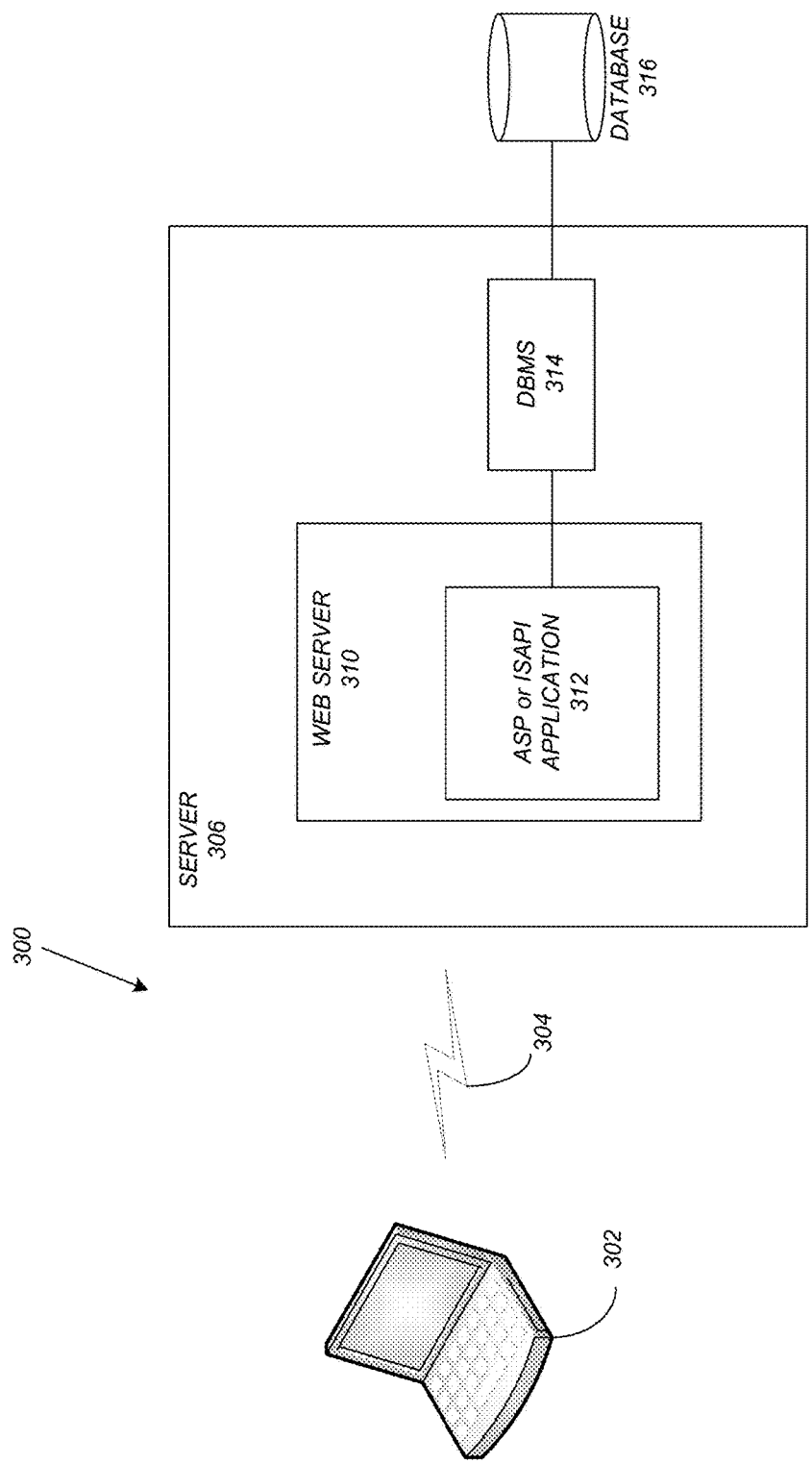
FIG. 3 schematically illustrates a typical distributed/cloud-based computer system using a network to connect client computers to server computers in accordance with one or more embodiments of the invention.

FIG. 3 schematically illustrates a typical distributed/cloud-based computer system 300 using a network 304 to connect client computers 302 to server computers 306. A typical combination of resources may include a network 304 comprising the Internet, LANs (local area networks), WANs (wide area networks), SNA (systems network architecture) networks, or the like, clients 302 that are personal computers or workstations (as set forth in FIG. 2), and servers 306 that are personal computers, workstations, minicomputers, or mainframes (as set forth in FIG. 2). However, it may be noted that different networks such as a cellular network (e.g., GSM [global system for mobile communications] or otherwise), a satellite based network, or any other type of network may be used to connect clients 302 and servers 306 in accordance with embodiments of the invention.

A network 304 such as the Internet connects clients 302 to server computers 306. Network 304 may utilize ethernet, coaxial cable, wireless communications, radio frequency (RF), etc. to connect and provide the communication between clients 302 and servers 306. Further, in a cloud-based computing system, resources (e.g., storage, processors, applications, memory, infrastructure, etc.) in clients 302 and server computers 306 may be shared by clients 302, server computers 306, and users across one or more networks. Resources may be shared by multiple users and can be dynamically reallocated per demand. In this regard, cloud computing may be referred to as a model for enabling access to a shared pool of configurable computing resources.

Clients 302 may execute a client application or web browser and communicate with server computers 306 executing web servers 310. Such a web browser is typically a program such as MICROSOFT INTERNET EXPLORER, MOZILLA FIREFOX, OPERA, APPLE SAFARI, GOOGLE CHROME, etc. Further, the software executing on clients 302 may be downloaded from server computer 306 to client computers 302 and installed as a plug-in or ACTIVEX control of a web browser. Accordingly, clients 302 may utilize ACTIVEX components/component object model (COM) or distributed COM (DCOM) components to provide a user interface on a display of client 302. The web server 310 is typically a program such as MICROSOFT'S INTERNET INFORMATION SERVER.

Web server 310 may host an Active Server Page (ASP) or Internet Server Application Programming Interface (ISAPI) application 312, which may be executing scripts. The scripts invoke objects that execute business logic (referred to as business objects). The business objects then manipulate data in database 316 through a database management system (DBMS) 314. Alternatively, database 316 may be part of, or connected directly to, client 302 instead of communicating/obtaining the information from database 316 across network 304. When a developer encapsulates the business functionality into objects, the system may be referred to as a component object model (COM) system. Accordingly, the scripts executing on web server 310 (and/or application 312) invoke COM objects that implement the business logic. Further, server 306 may utilize MICROSOFT'S TRANSACTION SERVER (MTS) to access required data stored in database 316 via an interface such as ADO (Active Data Objects), OLE DB (Object Linking and Embedding DataBase), or ODBC (Open DataBase Connectivity).

Generally, these components 300-316 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Embodiments of the invention are implemented as a software application on a client 302 or server computer 306. Further, as described above, the client 302 or server computer 306 may comprise a thin client device or a portable device that has a multi-touch-based display.

Although the terms "user computer", "client computer", and/or "server computer" are referred to herein, it is understood that such computers 302 and 306 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 302 and 306.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for simulating dynamic motion, comprising:
   (a) obtaining a computerized model for which dynamic motion will be simulated, wherein:
      (1) the computerized model comprises finite elements in a mesh; and
      (2) the computerized model represents a real-world object;
   (b) obtaining an element diagonal lumped mass matrix, M, for the mesh;
   (c) obtaining an estimate of a highest element eigenvector (v) of the mesh and a highest eigenvalue of the mesh;
   (d) obtaining a kinematic state of the computerized model;
   (e) iterating the following until a total time duration of the simulating is exceeded:
      (1) advancing a time and the kinematic state of the computerized model;
      (2) advancing a stress state of the computerized model;
      (3) computing an incremental strain tensor and an incremental stress tensor of a current time increment;
      (4) computing effective hypo-elastic material constants $\hat{\lambda}$ and $\hat{\mu}$ from the incremental strain and the incremental stress tensor; and
      (5) iterating the following until eigenvalues are converged:
         (A) computing a power-sweep strain field ($\varepsilon_{ij}$) from the highest element eigenvector (v) using a current gradient operator ($\beta_{ij}$) from a gradient operator matrix ($\beta$):

$\varepsilon_{ij}=\beta_{ij}v_j;$ (B) computing a power-sweep stress field ($\sigma_{ij}$) from the strain field ($\varepsilon_{ij}$) using effective hypo-elastic material constants, $\hat{\lambda}$ and $\hat{\mu}$:

$\sigma_{ij}=\hat{\lambda}\varepsilon_{kk}\delta_{ij}+2\hat{\mu}\varepsilon_{ij};$ (C) computing a divergence ($F_i$) of the power-sweep stress field ($\sigma_{ij}$) using the current gradient operator ($\beta_{ij}$):

$F_i=\beta_{ik}\sigma_{ik};$ wherein a repeated value of k specifies a sum over a range of k;
   (D) computing a power-sweep estimate, wherein the power sweep estimate comprises:
      (i) an estimate of the new highest eigenvector by dividing the computed divergence (F) by the element diagonal lumped mass matrix, M, at the current time increment; and
      (ii) an estimate of a highest eigenvalue based on the new highest eigenvector;
   (6) determining a new Courant stability limit based on the new highest eigenvalue; and
(f) generating and providing the simulation of the dynamic motion of the computerized model utilizing the new Courant stability limit as a time interval, wherein the simulation simulates a behavior of the real-world object in reaction to real-world physical affects.

2. The computer-implemented method of claim 1, wherein the obtaining the estimate of a highest element eigenvector comprises:
   upon a first time increment, the estimate comprises a normalized random number value;
   for subsequent time increments, the estimate comprises the eigenvector from the previous time increment.

3. The computer-implemented method of claim 1, wherein the kinematic state comprises a displacement, a velocity, and an acceleration field at all nodes of the mesh.

4. The computer-implemented method of claim 3, wherein the advancing the stress state of the computerized model comprises:
   (a) computing the gradient operator matrix ($\beta$) for all of the finite elements at the current time increment;
   (b) computing a displacement strain field using the gradient operator matrix ($\beta$) and displacements of the element's nodes (u), $\varepsilon=\beta u$;
   (c) computing a true model stress field from the displacement strain field using a material function that describes a strain behavior of an actual material, $\sigma=f(\varepsilon)$; and
   (d) computing a divergence of stress field from the true model stress field using the gradient operator matrix ($\beta$), $F=\beta^T\sigma$.

5. The computer-implemented method of claim 1, wherein the advancing the stress state of the computerized model comprises computing the gradient operator matrix ($\beta$) for all the finite elements at the current time increment.

6. The computer-implemented method of claim 1, wherein:
   convergence on the eigenvalues is reached when the estimate of the highest eigenvalue is within a threshold level of a prior highest eigenvalue from a prior iteration; and
   when convergence is not reached, the estimate of the highest eigenvector is used as the estimate of the highest element eigenvector (v) in a next iteration.

7. The computer-implemented method of claim 1, further comprising:

physically building a physical model, corresponding to the computerized model, based on the simulation.

8. A system for simulating dynamic motion, comprising:
(a) a computer;
(b) a dynamic motion simulation application executing on the application, wherein the dynamic motion simulation application:
  (1) obtains a computerized model for which dynamic motion will be simulated, wherein:
    (i) the computerized model comprises finite elements in a mesh; and
    (ii) the computerized model represents a real-world object
  (2) obtains an element diagonal lumped mass matrix, M, for the mesh;
  (3) obtains an estimate of a highest element eigenvector (v) of the mesh and a highest eigenvalue of the mesh;
  (4) obtains a kinematic state of the computerized model;
  (5) iterates the following until a total time duration of the simulating is exceeded:
    (A) advance a time and the kinematic state of the computerized model;
    (B) advance a stress state of the computerized model;
    (C) compute an incremental strain tensor and an incremental stress tensor of a current time increment;
    (D) compute effective hypo-elastic material constants $\hat{\lambda}$ and $\hat{\mu}$ from the incremental strain and the incremental stress tensor; and
    (E) iterate the following until eigenvalues are converged:
      (i) compute a power-sweep strain field ($\varepsilon_{ij}$) from the highest element eigenvector (v) using a current gradient operator ($\beta_{ij}$) from a gradient operator matrix ($\beta$):

$\varepsilon_{ij} = \beta_{ij} v_j$;

(ii) compute a power-sweep stress field ($\sigma_{ij}$) from the strain field ($\varepsilon_{ij}$) using effective hypo-elastic material constants, $\hat{\lambda}$ and $\hat{\mu}$:

$\sigma_{ij} = \hat{\lambda} \varepsilon_{kk} \delta_{ij} + 2\hat{\mu} \varepsilon_{ij}$;

(iii) compute a divergence ($F_i$) of the power-sweep stress field ($\sigma_{ij}$) using the current gradient operator ($\beta_{ij}$):
$F_i = \beta_{ik} \sigma_{ik}$; wherein a repeated value of k specifies a sum over a range of k;
      (iv) compute a power-sweep estimate, wherein the power sweep estimate comprises:
        (a) an estimate of the new highest eigenvector by dividing the computed divergence ($F_i$) by the element diagonal lumped mass matrix, M, at the current time increment; and
        (b) an estimate of a highest eigenvalue based on the new highest eigenvector;
      (F) determines a new Courant stability limit based on the new highest eigenvalue; and
  (6) generates and provides the simulation of the dynamic motion of the computerized model utilizing the new Courant stability limit as a time interval, wherein the simulation simulates a behavior of the real-world object in reaction to real-world physical affects.

9. The system of claim 8, wherein the dynamic motion simulation application obtains the estimate of a highest element eigenvector by:
upon a first time increment, the estimate comprises a normalized random number value;
for subsequent time increments, the estimate comprises the eigenvector from the previous time increment.

10. The system of claim 8, wherein the kinematic state comprises a displacement, a velocity, and an acceleration field at all nodes of the mesh.

11. The system of claim 10, wherein the dynamic motion simulation application advances the stress state of the computerized model by:
(a) computing the gradient operator matrix ($\beta$) for all of the finite elements at the current time increment;
(b) computing a displacement strain field using the gradient operator matrix ($\beta$) for all of the finite elements at the current time increment and displacements of all the element's nodes (u), $\varepsilon = \beta u$;
(c) computing a true model stress field from the displacement strain field using a material function that describes a strain behavior of an actual material, $\sigma = \sigma(\varepsilon)$; and
(d) computing a divergence of stress field from the true model stress field using the gradient operator matrix ($\beta$), $F = \beta^T \sigma$.

12. The system of claim 8, wherein the dynamic motion simulation application advances the stress state of the computerized model by computing the gradient operator matrix ($\beta$) for all the finite elements at the current time increment.

13. The system of claim 8, wherein:
convergence on the eigenvalues is reached when the estimate of the highest eigenvalue is within a threshold level of a prior highest eigenvalue from a prior iteration; and
when convergence is not reached, the estimate of the highest eigenvector is used as the estimate of the highest element eigenvector (v) in a next iteration.

14. The system of claim 8, further comprising:
a physical model that is built corresponding to the computerized model, based on the simulation.

* * * * *